DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 9

T939,008

PROCESS FOR PREPARING A POLYESTER FABRIC HAVING DESIRABLE STAIN-RELEASE, ANTI-SOIL-REDEPOSITION, ANTISTATIC AND HYDROPHILIC PROPERTIES

Robert B. Barbee, Rte. 3, Tinker Lane, Kingsport, Tenn. 37664

Filed Nov. 21, 1973, Ser. No. 418,162
Int. Cl. D06m *15/14, 15/36*
U.S. Cl. 8—115.5
No Drawing. 7 Pages Specification

Disclosed is a process for preparing fabrics which exhibit desirable stain-release, antisoil-redeposition, antistatic and hydrophilic properties. According to this process, a fabric comprised of a fiber of poly(ethylene terephthalate) modified with p-carboxycinnamic acid is contacted with acrylic acid and a free radical initiator under grafting reaction conditions.